United States Patent Office.

HENRI RAYMOND VIDAL, OF PARIS, FRANCE.

BLACK SULFUR DYE.

SPECIFICATION forming part of Letters Patent No. 618,152, dated January 24, 1899.

Application filed February 26 1897. Serial No. 625,211. (No specimens.)

*To all whom it may concern:*

Be it known that I, HENRI RAYMOND VIDAL, of Paris, France, have invented certain new and useful Improvements in the Manufacture of Coloring-Matters, (for which French Patent No. 231,188, dated July 22, 1896, has been obtained,) which are fully described in the following specification.

I have found that sulfur not only acts on the disubstituted derivatives of benzene or naphthalene, but also upon certain trisubstituted derivatives, and, among others, upon diamidophenols and upon diamidonaphthols. Thus by heating 3.2 kilograms of sulfur with 12.6 kilograms diamidophenol 1.2.4 I obtain a coloring-matter soluble in alkaline sulfids as a blue which dyes cotton black. To facilitate the reaction, it is expedient to add sulfuret of sodium in order to dissolve the sulfur and diamidophenol.

I may replace the diamidophenol 1.2.4 by the corresponding dinitrophenol or the mixture of dinitrophenols 1.2.4 and 1.2.6, obtained conjointly by the nitrification of phenol. In this latter case it will be necessary to previously reduce the dinitrophenols by means of sulfuret of sodium and to add sulfur to the reduced mass. The coloring-matters obtained by these reactions are, like that first above described, black in color and are soluble in alkaline sulfids, in weak acid solutions of bichromate of potash, and in alkalies.

The dinitrophenols may be replaced by dinitronaphthols, such as the 1.2.4, or naphthalene yellow. It will be also useful in this case to reduce the nitrified compound by means of sulfuret of sodium and to subsequently add sulfur. For example: I take sulfuret of sodium, three kilograms, and dinitrophenol, one kilogram, (eight hundred and forty grams.) I heat the mixture to above 140° centigrade in a suitable vessel provided with a reducing-agitator, and after reduction I add sulfur, three hundred and fifty grams. When discharged from the apparatus, the mass is crushed to a state suitable for sale. The resulting coloring-matter resembles in its general characteristics those already described, being black in color, soluble in the same substances, and dyeing cotton black. It, however, imparts a greenish hue to an alkaline sulfid when dissolved therein.

The derivatives of benzene and naphthalene bear very close relations, since the latter may be considered as the result of the condensation of two molecules of benzene, connected with each other at two neighboring positions, or ortho. The characters of the different substitution products of benzene and naphthalene present a great similitude, so that a reaction which succeeds with benzene derivatives will almost always take place under the same conditions with the naphthalene derivatives. In the present case the two are equivalents, and this being so it is to be understood that where hereinafter in the claims mention is made only of the derivatives of benzene those of naphthalene are included.

Having now particularly described and ascertained the nature of my said invention, I declare that what I claim is—

1. The above-described improvement in the manufacture of black dyestuffs, said improvement consisting in causing sulfur to react upon a trisubstituted derivative of benzene, such as diamidophenol, as hereinbefore described.

2. The described coloring-matters resulting from the reaction of sulfur upon a trisubstituted derivative of benzene (such as diamidophenol) said coloring-matters being black in color, soluble in alkaline sulfids, in acid solutions of bichromate of potash and in alkalies, and dyeing cotton black, as set forth.

In testimony whereof I have signed this specification in the presence of two subscribing witnesses.

HENRI RAYMOND VIDAL.

Witnesses:
 EDWARD P. MACLEAN,
 ANTOINE ROUSSAN